(12) United States Patent
Sinks et al.

(10) Patent No.: US 12,445,464 B2
(45) Date of Patent: Oct. 14, 2025

(54) THRESHOLD BASED DETECTION

(71) Applicant: Bank of America Corporation, Charlotte, NC (US)

(72) Inventors: Steven Sinks, Scottsdale, AZ (US); Brian Devine, Austin, TX (US); Jonathan Sheedy, Poynton (GB); Matthew Findley, Severna Park, MD (US); Jared Wilson, Charlotte, NC (US); Joshua Jenkins, Charlotte, SC (US); Donald Hess, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 231 days.

(21) Appl. No.: 18/205,798

(22) Filed: Jun. 5, 2023

(65) Prior Publication Data
US 2024/0406191 A1    Dec. 5, 2024

(51) Int. Cl.
*H04L 9/00*    (2022.01)
*H04L 9/40*    (2022.01)

(52) U.S. Cl.
CPC ........ *H04L 63/1416* (2013.01); *H04L 63/145* (2013.01); *H04L 63/20* (2013.01)

(58) Field of Classification Search
CPC .... H04L 63/1416; H04L 63/145; H04L 63/20
See application file for complete search history.

(56) References Cited

U.S. PATENT DOCUMENTS

| | | | |
|---|---|---|---|
| 8,931,099 B2 | 1/2015 | Lahann et al. | |
| 9,594,881 B2 | 3/2017 | Bhargava et al. | |
| 2008/0184371 A1* | 7/2008 | Moskovitch | G06F 21/566 706/12 |
| 2014/0130161 A1* | 5/2014 | Golovanov | H04L 63/1416 726/23 |
| 2015/0121449 A1* | 4/2015 | CP | G06F 21/566 726/1 |
| 2016/0212165 A1* | 7/2016 | Singla | H04L 63/1433 |
| 2017/0250997 A1* | 8/2017 | Rostamabadi | H04L 63/1416 |
| 2018/0121650 A1* | 5/2018 | Brown | G06F 21/568 |
| 2020/0184072 A1* | 6/2020 | Ikeda | G06N 20/20 |

* cited by examiner

*Primary Examiner* — Syed M Ahsan
(74) *Attorney, Agent, or Firm* — Banner & Witcoff, Ltd.

(57) ABSTRACT

Various aspects of the disclosure relate to automated monitoring and detection of computing threats. A threat detection computing system is configured to monitor for security threats on a networked system. The threat detection system monitors process calls to detect otherwise benign activity that exceeds an expected threshold and identifies threat actor actions that would otherwise go un-noticed and be associated with normal computer activity.

2 Claims, 3 Drawing Sheets

THRESHOLD BASED DETECTION

BACKGROUND

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

Multiple users active on the enterprise organization's computing network may provide an entry point for a malicious actor, such as by targeting one or more computing devices to gain unauthorized access to the enterprise computing network. These malicious actors continue to develop new ways to attempt unauthorized activity by executing highly obfuscated malicious actions. These malicious actors mimic authorized user actions to prevent detection. Accordingly, it would be advantageous to detect these otherwise benign activities or patterns of benign activities that exceed expected thresholds to identify threats or potential threats to products and services offered by an organization.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like). Aspects of the disclosure relate to computer hardware and software. In particular, one or more aspects of the disclosure generally relate to computer hardware and software for threat detection of networked computing devices to identify suspicious behaviors or patterns of behaviors that may indicate a security threat. The threat detection computer system may identify malicious activity based on discovered patterns of seemingly benign actions.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes automatic threat detection and triggering of threat mitigation activities including quarantine, analysis, and reporting activities.

To overcome the outlined problems as described above, a threat detection computing system is configured to monitor for security threats on a networked system. The threat detection system monitors process calls to detect otherwise benign activity that exceeds an expected threshold and identifies threat actor actions that would otherwise go unnoticed and be associated with normal computer activity.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

Figure 1A:
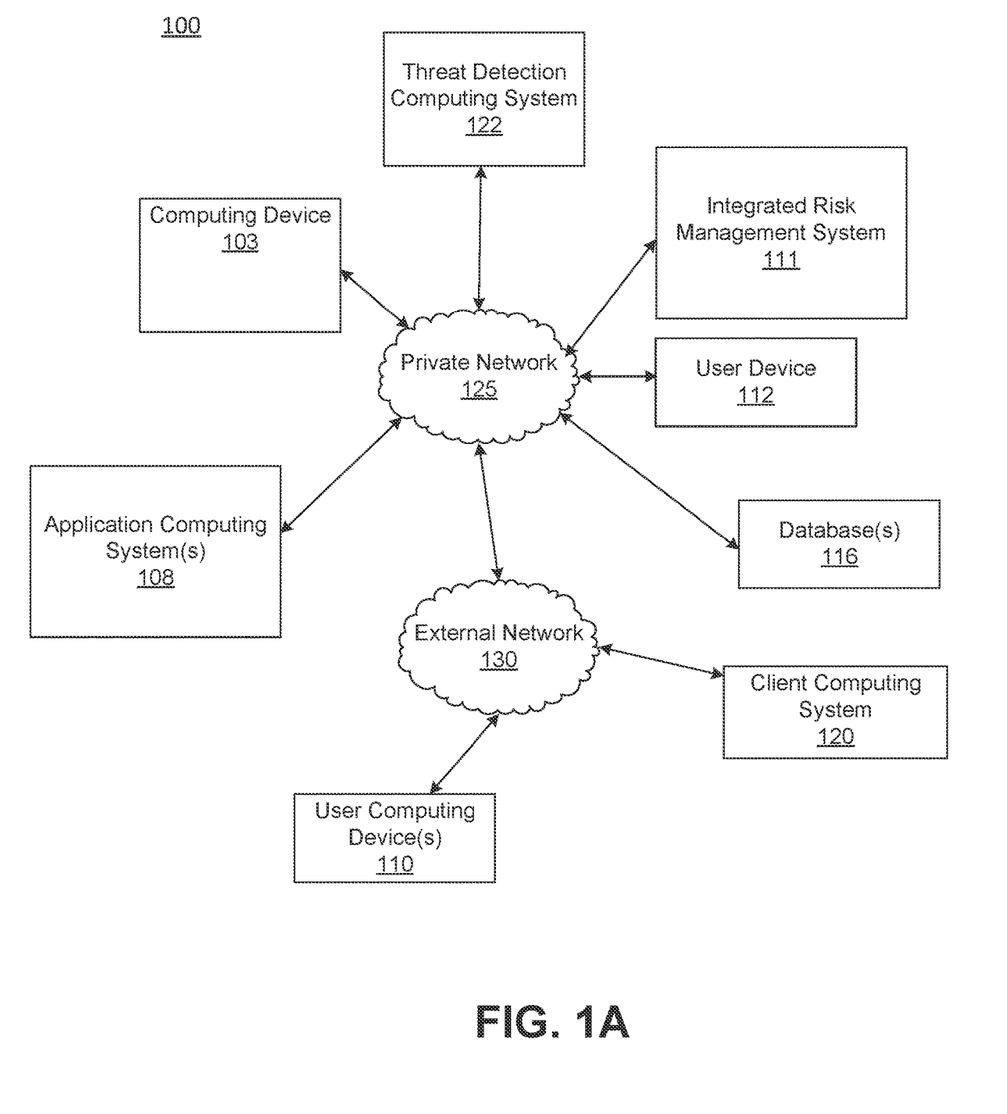
FIG. 1A shows an illustrative threat detection computing environment for a threat detection computing system in accordance with one or more aspects described herein.
Figure 1B:
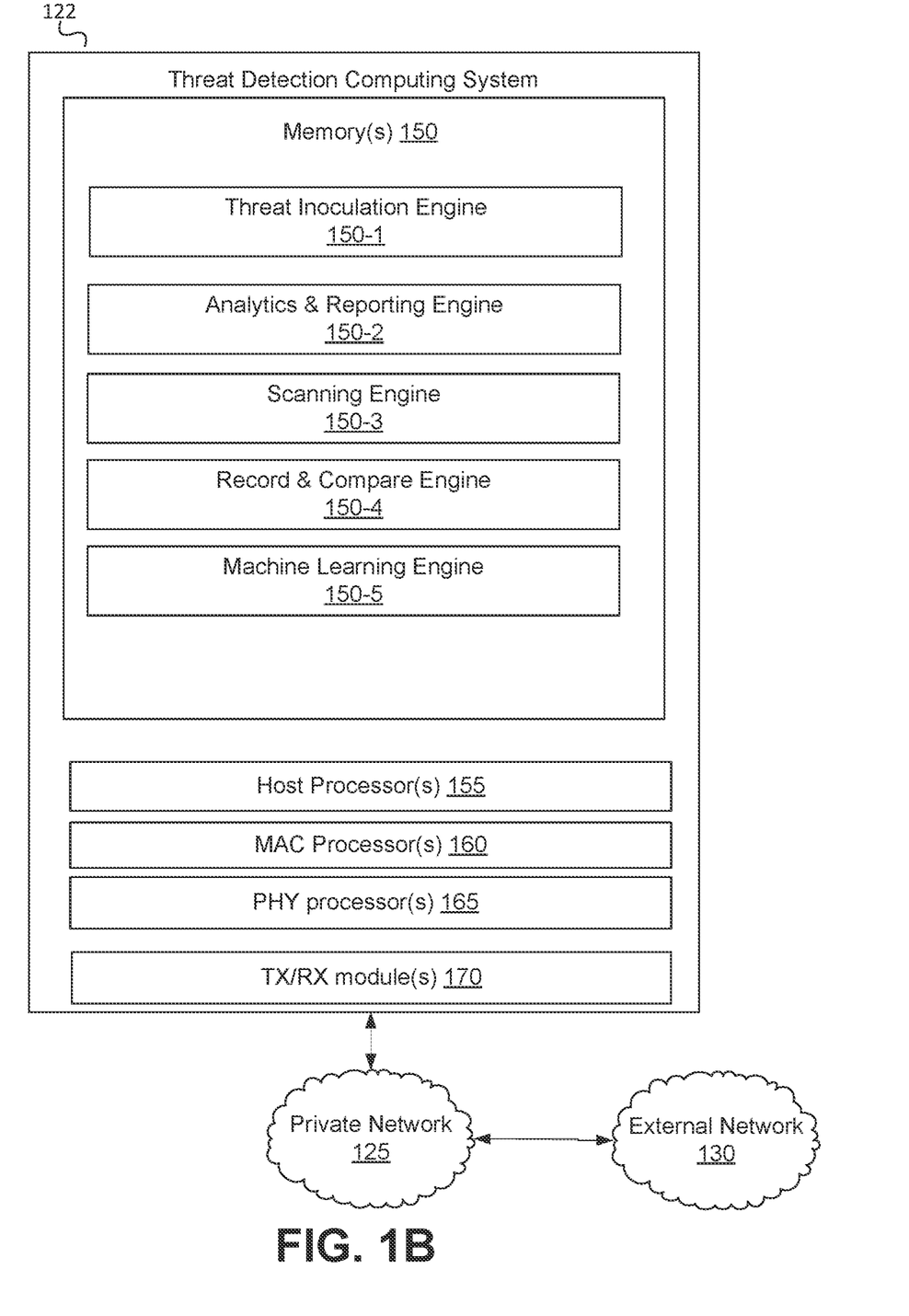
FIG. 1B shows an illustrative threat detection computing system in accordance with one or more aspects described herein.
Figure 2:
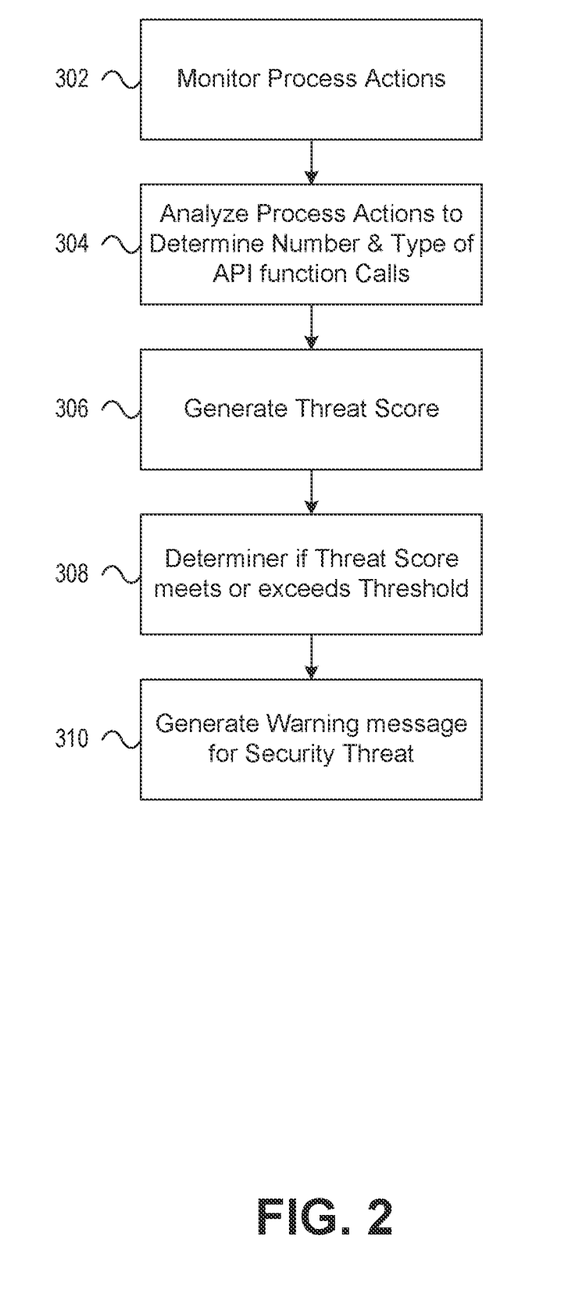
FIG. 2 shows an illustrative method of threat detection in accordance with one or more aspects described herein.

FIGS. 1A-1B depict an illustrative computing environment 100 for implementing a threat detection system in accordance with one or more arrangements. The computing environment 100 may comprise one or more devices (e.g., computer systems, communication devices, and the like). The computing environment 100 may comprise, for example, a computing device 103, an integrated risk management system 111, threat detection computing system 122, one or more locally networked user devices 112, or more application computing systems 108, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise a client computing system 120 and one or more user devices 110 connected, via an external network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a 3rd Generation Partnership Project (3GPP) cellular protocol, a hypertext transfer protocol (HTTP), etc.). While FIG. 1A shows the threat detection computing system 122 as being a standalone system, portions of threat detection computing system 122 may be implemented on each individual computing device that is connected to the private network 125 and/or can access the private network 125 via the external network 130.

The computing device 103 may comprise one or more computing devices and/or other computer components (e.g., processors, memories, communication interfaces) configured to perform one or more functions as described herein, such as and hosting an instance of the threat detection computing system 122. Further details associated with the architecture of the threat detection computing system 122 are described with reference to FIG. 1B. Every computing device associated with the enterprise network, such as the computing device 103, the computing devices of the threat detection computing system 122, the integrated risk management system 111, the user device 112, and computing devices of the application computing system(s) 108 may each include an instance of the threat detection computing system 122.

The application system 108 and/or the threat detection computing system 122 may comprise one or more computing devices and/or other computer components (e.g., processors, memories, communication interfaces). In addition, the application system 108 may be configured to host, execute, and/or otherwise provide one or more enterprise applications. In some cases, the application systems 108 may host one or more services configured to facilitate operations requested through one or more API calls, such as data retrieval and/or initiating processing of specified functionality. In an arrangement where the private network 125 is associated with a financial institution (e.g., a bank), the application systems 108 may be configured, for example, to host, execute, and/or otherwise provide one or more transaction processing programs, such as an online banking application, fund transfer applications, and/or other programs associated with the financial institution. The application systems 108 may comprise various servers and/or databases that store and/or otherwise maintain account information, such as financial account information including account balances, transaction history, account owner information, and/or other information. In addition, the application systems 108 may process and/or otherwise execute transactions on specific accounts based on commands and/or other information received from other computer systems comprising the computing environment 100. In some cases, one or more of the application systems 108 may be configured, for example, to host, execute, and/or otherwise provide one or more transaction processing programs, such as electronic fund transfer applications, online loan processing applications, and/or other programs associated with the financial institution.

The application systems 108 may be one or more host devices (e.g., a workstation, a server, and the like) or mobile computing devices (e.g., smartphone, tablet). In addition, an application systems 108 may be linked to and/or operated by a specific enterprise user (who may, for example, be an employee or other affiliate of the enterprise organization) who may have administrative privileges to perform various operations within the private network 125. In some cases, the application system 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing system 120 may comprise one or more computing devices and/or other computer components (e.g., processors, memories, communication interfaces). The client computing system 120 may be configured, for example, to host, execute, and/or otherwise provide one or more transaction processing programs, such as goods ordering applications, electronic fund transfer applications, online loan processing applications, and/or other programs associated with providing a product or service to a user. The client computing system 120 may be associated with a specific financial transaction and may communicate with one or more other platforms within the client computing system 120. In some cases, the client computing system 120 may integrate API calls to request data, initiate functionality, or otherwise communicate with one or more application computing systems 108.

The user computing device(s) 110 may include computer devices (e.g., desktop computers, laptop computers) or mobile computing device (e.g., smartphones, tablets) connected to the network 130. The user device(s) 110 may be configured to enable the user to access the various functionalities provided by the devices, applications, and/or systems in the network 130.

The database(s) 116 may comprise one or more computer-readable memories storing information that may be used by the threat detection computing system 122, the endpoint detection management system 122, the integrated management system 111, the application computing systems 108 and/or the like. For example, the database(s) 116 may store vulnerability information, inventory information, security information, user management information, and the like. In an arrangement, the database(s) 116 may be used for other purposes as described herein. In some cases, the client computing system 120 may write data or read data to the database(s) 116 via the services.

In one or more arrangements, the threat detection computing system 122, the application computing systems 108, client computing system 120, the user computing devices 110, and/or the other devices/systems in the computing environment 100 may be any type of computing device capable of receiving input via a user interface, and communicating the received input to one or more other computing devices in the computing environment 100. For example, the threat detection system 122, the application computing systems 108, client computing system 120, the user devices 110, and/or the other devices/systems in the computing environment 100 may, in some instances, be and/or include server computers, desktop computers, laptop computers, tablet computers, smart phones, wearable devices, or the like may be comprised of one or more processors, memories, communication interfaces, storage devices, and/or other components. Any and/or all of the threat detection computing system 122, the application computing systems 108, client computing system 120, the user devices 110, and/or the other devices/systems in the computing environment 100 may, in some instances, be and/or comprise special-purpose computing devices configured to perform specific functions.

FIG. 1B shows an illustrative threat detection system 122 in accordance with one or more examples described herein. The threat detection system 122 may be installed on a standalone computing device and/or may at least be partially integrated with a computing platform or computing system, and may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or TX/RX module(s) 170, and/or memory 150. The threat detection computing system 122 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the threat detection computing system 122 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 125. Similarly, the PHY processor(s) 165 may receive PHY data units from the TX/RX module(s) 170, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the threat detection computing system 122 may be configured to execute machine readable instructions stored in memory 150. The memory 150 may comprise (i) one or more program modules/engines having instructions that when executed by the one or more processors cause the threat detection computing system 122 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the threat detection computing system 122 and/or by different computing devices that may form and/or otherwise make up the threat detection computing system 122. For example, the memory 150 may have, store, and/or comprise a threat inoculation engine 150-1, an analytics and reporting engine 150-2, a scanning engine 150-3 and/or the like. The threat inoculation engine 150-1 may have instructions that direct and/or cause the threat detection computing system 122 to perform one or more operations associated with monitoring operation of a computing device, identifying vulnerabilities and/or identifying potential exposure to a vulnerability, and the like.

In an embodiment, threat inoculation engine 150-1 may cause an exposed computing system and/or one or more user accounts to be quarantined, trigger analytics and reporting engine 150-2 to notify one or more users, via a communication transmitted to a user device such that a user associated with a quarantined device may be notified that the computing system had been exposed to a security threat and has been quarantined.

The analytics and reporting engine 150-2 may have instructions that may cause the threat detection computing system 122 to perform activities to report vulnerability exposure of the computing device 103 and/or communicate, to one or more associated computing devices, that the computing device 103 was exposed to a possible assertion of a security vulnerability and that one or more associated computing accounts have been disabled and/or the computing device 103 has been quarantined. The scanning engine 150-2 may have instructions that may cause the threat detection computing system 122 to perform scanning of the computing device 103 and/or to perform threat mitigation activities based on the scan.

In an embodiment, once threat detection computing system 122 identifies a threat or potential threat to the computing device, the computing device may be quarantined and associated user's accounts disabled in the enterprise computing network, such as by leveraging active directory functionality. Threat detection computing system 122 may analyze an impact of the potential threat and initiate remediation steps, such as antivirus scanning and/or review of user account activities from a time before a suspect file was created or from the time file creation on the host to the time of quarantine.

In an embodiment, scanning engine 150-2 may scan for process calls such as API (Application Programming Interface) calls. The number of API calls and types of API calls may be recorded and compared to a threshold using record and compare engine 150-4. Analytics and reporting engine 105-2 may determine based on at least the comparison by the record and compare engine 150-4 if the API calls are benign or a malicious act by a threat actor.

In an embodiment, threat detection computing system 122 enables entities to detect otherwise benign activity that exceeds an expected threshold. Threat detection computing system 122 may identify threat actor actions that would otherwise go unnoticed and be associated with normal computer activity.

In an aspect of the disclosure, threat detection computing system 122 may maintain a record of all process actions over a predetermined time period. In an embodiment, threat detection computing system 122 may record the number of times a process calls an API function such as SetCurrentDirectory API function, a registry key, or executes a known binary (i.e. an executable file that could launch an application or a web browser).

In another aspect of the disclosure, threat detection computing system 122, may search for actions that a threat actor may perform to compromise a computing system. Such actions may include attempting to change working directories just after initial compromise of a computing device. Threat detection computing system 122 may monitor for changes of working directories as processes rarely change the working directory they are running from; however, threat actors may inject into a process to hide who they are and often change to other directories while performing file system enumerations.

In an embodiment, exceeding expected metric thresholds for certain benign actions by threat detection computing system 122 may suggest a compromised computer system and the user of command and control (C2) activity within a process. For instance, entering the command "whoami" numerous times or across multiple lateral computing devices may suggest a security threat.

In another aspect of the disclosure, threat detection computing system 122 may generate a threat score that may be compared to one or more thresholds to determine whether the overall detected process actions indicate a potential threat occurrence. The threat score may be updated with each detected process action.

In some examples, machine learning may be used to compare the detected process action to known possible process action combinations. For instance, threat detection computing system 122 may further have, store and/or include machine learning engine 150-5. Machine learning engine 150-5 may store instructions and/or data that may cause or enable threat detection computing system 122 to train, execute, validate and/or update one or more machine learning models that may be used to determine a likelihood that one or more process actions, or one or more combinations of process action indicate a threat potential. In some examples, the machine learning model may be trained (e.g., using historical data related to process actions and combinations of process actions such as number of times a process may typically call API functions, registry keys, executable binaries) to identify patterns or sequences in data that indicate or output a likelihood that that a potential security threat exists. For instance, a user does not typically change active directories or move across an enterprise computing environment in a desktop to desktop manner (i.e. lateral movement). A typical enterprise user may just be exchanging information between a desktop and enterprise server. The trained machine learning model may identify these atypical patterns and determine that a security threat exists. The trained learning model may also discover placement of binaries in locations that raise concern. In addition, the machine learning model may be continuously or near continuously updated or validated to continue to improve accuracy.

In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models.

Threat detection computing system 122 may generate one or more actions based on the results of comparing the detected process actions to historical process actions (e.g., via the machine learning model). For instance, based on an output of the machine learning model, the requested enterprise event may be denied and a notification generated and transmitted to the user device from which the request was received. Additionally or alternatively, the request for enterprise event, and associated outputs, analysis, and the like, may be transmitted to an internal entity system for further analysis or evaluation. For instance, the request may be transmitted to an unauthorized activity detection and action team to determine and/or execute an appropriate mitigation action.

In an aspect of the disclosure, threat detection computing system 122 may comprise multiple computing devices communicatively connected to an enterprise computing system, which may include one or more host computing devices, server computing devices, work stations, end user computing systems, and the like. Each computing system may have an instance of the threat detection computing system 122 installed, where the threat detection computing system 122 may monitor operation and/or activities performed by the computing system to identify whether a vulnerability has been leveraged to expose the computing system to malware and/or other malicious activities.

FIG. 3 depicts and illustrative method of threat detection in accordance with one or more example embodiments. Referring to FIG. 3, at step 302, a threat detection computing system comprising memory, one or more processors, and a communication interface, may monitor a networks process actions for an indication of a security threat to the operation of the computing device associated with the network. In step 304, the threat detection computing system may analyze the monitored process actions to determine type and number of process calls to application programming interface functions. At step 306, the threat detection computing system may generate a threat score based on the analyzed type and number of process calls to application programming interface functions. In step 308, the threat detection computing system may determine if the generated threat score meets or exceeds a threat threshold. In step 310, if the generated threat score meets or exceeds the threat threshold, threat detection computing system may generate at least one warning message indicating a security threat. In an embodiment, the generated at least one warning message may be based on priority, a threat level, and/or the particular computing device involved.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A method for detecting security threats in a networked computing environment, comprising:
   monitoring, by a threat detection system executing on a computing device within the networked computing environment, process actions of the computing device to identify an indication of a security threat to operation of the computing device, wherein the process actions include system-level operations initiated by software processes running on an operating system of the computing device;
   analyzing, by the threat detection system, the monitored process actions to determine a type and a number of process calls to application programming interface functions, wherein the type includes a specific identifier of each application programming interface function called and the number represents a total count of calls to each identified application programming interface function over a predefined time period;
   tracking, by the threat detection system, a frequency of directory change operations initiated by the process calls to the application programming interface functions, wherein the directory change operations modify a working directory of a process executing on the computing device, and wherein the frequency is calculated as a rate of directory change operations per unit of time based on timestamps associated with each operation;
   analyzing, by the threat detection system, the monitored process actions to determine a type and a number of process calls to registry key functions and application programming interface functions, wherein the type of registry key functions includes specific registry key access operations and the number represents a total count of such operations over the predefined time period;
   analyzing, by the threat detection system, the monitored process actions to determine a type and a number of process calls to registry key functions, application programming interface functions, and executable binaries, wherein the type of executable binaries includes identifiers of executable files launched and the number represents a total count of launches over the predefined time period;
   generating, by the threat detection system, a threat score based on the type and the number of process calls to the application programming interface functions, the type and the number of process calls to the registry key functions, the type and the number of process calls to the executable binaries, and the frequency of directory change operations exceeding a predefined directory change threshold, wherein generating the threat score is performed by executing a machine learning model using at least the monitored process actions as inputs to generate an output, wherein the machine learning model is trained on historical data of benign and malicious process actions to assign weighted values to each determined type and number of process calls and the frequency of directory change operations;

comparing, by the threat detection system, the generated threat score to a predefined threat threshold, wherein the predefined threat threshold is a numerical value established based on historical threat detection data specific to the networked computing environment;

responsive to determining that the generated threat score meets or exceeds the predefined threat threshold, generating, by the threat detection system, a warning message indicating the security threat, wherein the warning message includes a description of the detected threat, an identifier of the computing device, and a timestamp of detection;

responsive to determining that the generated threat score meets or exceeds the predefined threat threshold, restricting, by the threat detection system, network connectivity of the computing device to prevent lateral movement of the security threat within the networked computing environment, wherein restricting network connectivity includes blocking outbound network traffic from the computing device to other devices in the networked computing environment;

responsive to determining that the generated threat score meets or exceeds the predefined threat threshold, disabling, by the threat detection system, a user account associated with the computing device, wherein disabling the user account includes revoking authentication credentials of the user account within an active directory of the networked computing environment;

quarantining, by the threat detection system, the computing device from a network connection based on the indication of the security threat, wherein quarantining includes isolating the computing device to a restricted network segment that prohibits communication with operational systems in the networked computing environment; and automatically initiating, by the threat detection system, a threat remediation process for the computing device, wherein the threat remediation process includes executing an antivirus scan on the computing device and reviewing a log of user account activities from a time prior to detection of the security threat to identify a source of the security threat.

2. A system for detecting security threats in a networked computing environment, comprising:

a computing device within the networked computing environment, the computing device including a processor and non-transitory memory;

a threat detection system stored in the non-transitory memory of the computing device and executable by the processor, the threat detection system comprising:

a monitoring module configured to monitor process actions of the computing device to identify an indication of a security threat to operation of the computing device, wherein the process actions include system-level operations initiated by software processes running on an operating system of the computing device, and wherein the monitoring module records timestamps and identifiers for each process action;

an analysis module configured to analyze the monitored process actions to determine a type and a number of process calls to application programming interface functions, wherein the type includes a specific identifier of each application programming interface function called and the number represents a total count of calls to each identified application programming interface function over a predefined time period stored in a configuration file of the threat detection system;

a directory tracking module configured to track a frequency of directory change operations initiated by the process calls to the application programming interface functions, wherein the directory change operations modify a working directory of a process executing on the computing device, and wherein the frequency is calculated as a rate of directory change operations per minute based on the timestamps recorded by the monitoring module;

a registry analysis module configured to analyze the monitored process actions to determine a type and a number of process calls to registry key functions, wherein the type of registry key functions includes specific registry key access operations such as read, write, or modify, and the number represents a total count of such operations over the predefined time period;

a binary analysis module configured to analyze the monitored process actions to determine a type and a number of process calls to executable binaries, wherein the type of executable binaries includes file names and paths of executable files launched by the process actions, and the number represents a total count of launches over the predefined time period;

a scoring module configured to generate a threat score based on the type and the number of process calls to the application programming interface functions determined by the analysis module, the type and the number of process calls to the registry key functions determined by the registry analysis module, the type and the number of process calls to the executable binaries determined by the binary analysis module, and the frequency of directory change operations exceeding a predefined directory change threshold stored in the configuration file, wherein the scoring module includes a machine learning engine trained on a dataset of historical benign and malicious process actions to assign weighted values to each determined type and number of process calls and the frequency of directory change operations;

a comparison module configured to compare the generated threat score to a predefined threat threshold, wherein the predefined threat threshold is a numerical value derived from statistical analysis of prior security threats within the networked computing environment and stored in the configuration file;

a notification module configured to, responsive to the comparison module determining that the generated threat score meets or exceeds the predefined threat threshold, generate a warning message indicating the security threat, wherein the warning message includes a detailed report specifying the detected threat, an identifier of the computing device, the generated threat score, and a timestamp of detection;

a network restriction module configured to, responsive to the comparison module determining that the generated threat score meets or exceeds the predefined threat threshold, restrict network connectivity of the computing device to prevent lateral movement of the security threat within the networked computing environment, wherein the network restriction module blocks all outbound network traffic from the computing device to other devices in the networked computing environment by modifying firewall rules;

an account management module configured to, responsive to the comparison module determining that the generated threat score meets or exceeds the predefined threat threshold, disable a user account associated with the computing device, wherein the account management module interfaces with an active directory server of the networked computing environment to revoke authentication credentials of the user account;

a quarantine module configured to quarantine the computing device from a network connection based on the indication of the security threat identified by the monitoring module, wherein the quarantine module reconfigures network settings to isolate the computing device to a restricted virtual local area network segment that prohibits communication with operational systems; and a remediation module configured to automatically initiate a threat remediation process for the computing device, wherein the remediation module executes an antivirus scan targeting files and processes identified in the monitored process actions, generates a log of remediation actions, and reviews a historical log of user account activities from a time period prior to detection of the security threat to identify a source of the security threat, the historical log being retrieved from a database of the networked computing environment.

* * * * *